E. FLENTJE.
HANGER FOR SHOCK ABSORBERS.
APPLICATION FILED SEPT. 27, 1909.
943,671.
Patented Dec. 21, 1909.
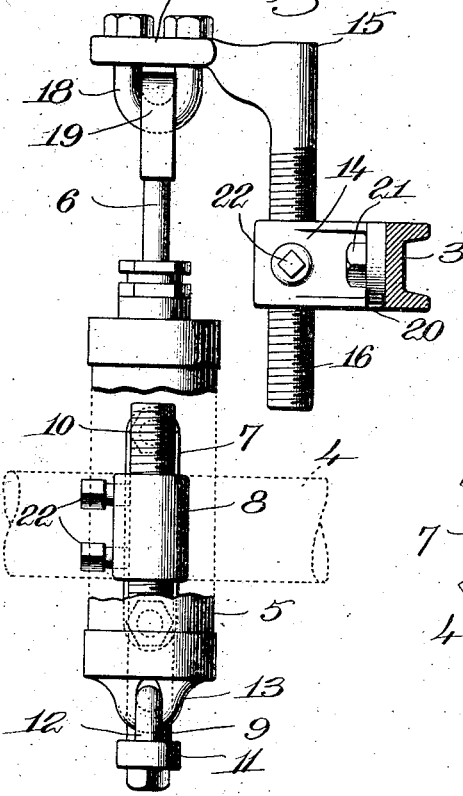
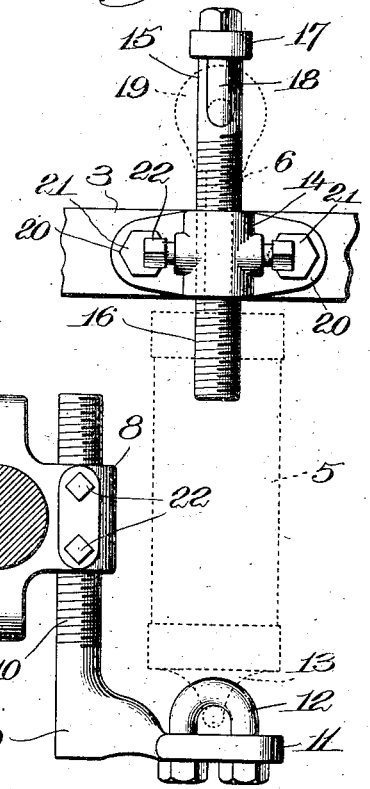
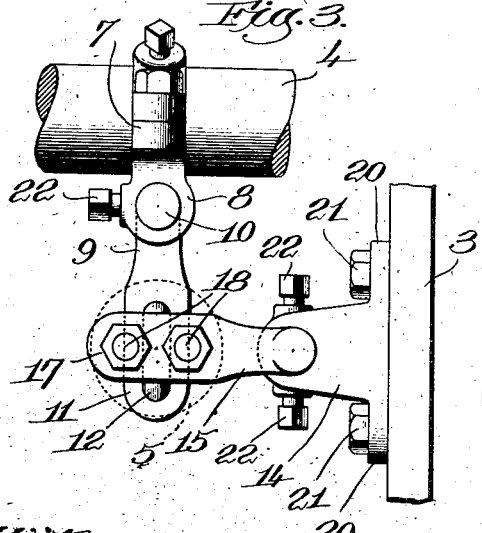
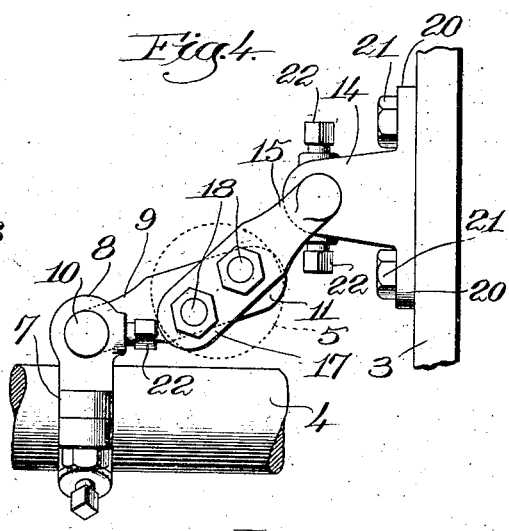
Witnesses.
Thomas J. Drummond.
Joseph M. Ward.
Inventor.
Ernst Flentje,
by Beverly G. Gwynn attys.

UNITED STATES PATENT OFFICE.

ERNST FLENTJE, OF CAMBRIDGE, MASSACHUSETTS.

HANGER FOR SHOCK-ABSORBERS.

943,671.

Specification of Letters Patent. Patented Dec. 21, 1909.

Application filed September 27, 1909. Serial No. 519,776.

*To all whom it may concern:*

Be it known that I, ERNST FLENTJE, a citizen of the United States, residing at Cambridge, county of Middlesex, and State of Massachusetts, have invented an Improvement in Hangers for Shock-Absorbers, of which the following description, in connection with the accompanying drawing, is a specification, like characters on the drawing representing like parts.

In my Patent No. 899,662, dated September 29, 1908, I have illustrated a shock absorber for automobiles which involves a cylinder filled with liquid such as glycerin and which is connected to the axle of the car and in which plays a piston that is connected to the frame of the car body, said cylinder and piston constituting a retarding device to retard or ease the movement of the springs. The device shown in said patent involves two brackets or hanger members, one secured to the axle and having a projecting foot portion to which the cylinder is connected, and the other secured to the car body frame and having an overhanging portion to which the piston rod is connected. In order that the shock absorber may work properly, it is essential that the two hanger members should be so located on the axle and car body that the foot portion of one and the overhanging portion of the other will stand in vertical alinement with each other, so that the cylinder and piston may occupy a vertical position. I find, however, that in applying the shock absorbers to automobiles it is sometimes difficult to properly position the hanger members to secure this end either because of some peculiarity in the construction of the frame or because of the particular location of some important part of the automobile. In order to overcome these objections, I have devised the hanger which is made the subject of this application and which involves two hanger members having such a construction that they may be placed in a variety of positions and yet be so adjusted as to bring the foot portion of one and the overhanging portion of the other in vertical alinement.

I will first describe one embodiment of my invention and then point out the novel features thereof in the appended claims.

In the drawings, Figure 1 is a view of my improved hanger device taken on a vertical plane transversely of the frame of an automobile and parallel to the axis, said view showing a portion only of the frame; Fig. 2 is a view taken at right angles to Fig. 1; Fig. 3 is a top plan view of Fig. 1; Fig. 4 is a top plan view showing the parts applied to the automobile in a different position from what is shown in Fig. 3.

A portion of the frame of an automobile is shown at 3 and one of the axles at 4. The shock absorber herein shown may be similar to that shown in my above-mentioned patent, and it comprises the cylinder 5 having therein a piston provided with a piston rod 6. The cylinder of the shock absorber is connected either to the axle or to the frame and the piston rod is connected to the other part. I have herein shown the cylinder as connected to the axle and the piston rod as connected to the frame. For connecting the cylinder to the axle I employ a hanger device which embodies a clip 7 adapted to be clamped to the axle and provided with a boss 8 and a hanger member 9 provided with a laterally-extending foot 11 and a stem 10 which is secured to the boss 8 and is mounted to turn therein. The foot 11 carries a loop or clevis 12 to which is connected an eye 13 on the bottom of the cylinder 5.

For securing the piston rod to the frame 3 I provide another hanging device comprising a bracket or arm 14 which is secured to the side sills of the frame 3 and a hanger member 15 having the downwardly-directed stem 16 which is secured to the bracket 14 and is mounted to turn therein and which is also provided with the laterally-extending or overhanging portion 17 that carries a clevis 18 to which an eye 19 on the end of the piston rod 6 is connected. Since the stems of both of the hanger devices are mounted to turn in the boss 8 and bracket 14, it will be seen that the position of the bracket longitudinally of the frame and the position of the clip longitudinally of the axle may be varied and yet the overhanging portion 17 and foot 11 may be brought in vertical alinement so that the piston and cylinder will stand vertically. This is made apparent from Figs. 3 and 4 wherein different positions of the hanger members are shown.

The stems of the two hanger members may be swiveled to the boss 8 and bracket 14 in any suitable way, but I will preferably screw-thread the stem to these parts because a screw-threaded engagement not only permits the hanger members to turn, but also permits the adjustment of the hanger members vertically. This latter feature is sometimes of great advantage because the distance between the axle and the frame of the automobile varies in different makes of cars and by having the stems of the hanger member screw-threaded to the bracket and boss, respectively, said hanger members may be adjusted vertically to bring the overhanging portions 17 the proper distance from the foot 11.

With a device such as herein shown my improved shock absorber may be applied to any style of car without changing the position of any of the parts or making any alterations or changes in the construction of the frame.

The bracket 14 is shown as having ears 20 which overlie the side sills of the car and are bolted thereto by bolts 21, and I will preferably place the bolts in line with each other longitudinally of the sill, as this will weaken the sill less than if the bolts were in line with each other transversely of the sill. I also propose to use set screws 22 to prevent the stems from turning in the boss or bracket after they have been properly adjusted.

Having fully described my invention, what I claim as new and desire to secure by Letters Patent is:—

1. In a shock absorber, the combination with a cylinder and a piston therein, of a clip adapted to be secured to the axle of a car, a hanger member having a stem swiveled to said clip and provided with a laterally-extending foot which is connected to the cylinder, a bracket secured to the frame of the car, and another hanger device provided with a stem which is swiveled to the bracket and provided with an overhanging portion that is connected to the piston rod.

2. In a shock absorber, the combination with a cylinder and a piston therein, of a clip adapted to be secured to the axle of a car, a hanger member having a stem screw-threaded to said clip and provided with a laterally-extending foot which is connected to the cylinder, a bracket secured to the frame of the car, and another hanger device provided with a stem which is screw-threaded to the bracket and provided with an overhanging portion that is connected to the piston rod.

In testimony whereof, I have signed my name to this specification, in the presence of two subscribing witnesses.

ERNST FLENTJE.

Witnesses:
 LOUIS C. SMITH,
 THOMAS J. DRUMMOND.